J. T. McNORTON & J. S. STANLEY.
MACHINE FOR WASHING CLOTHES, RENOVATING FEATHERS, CANNING, &c.
APPLICATION FILED MAY 26, 1910.
982,385. Patented Jan. 24, 1911.
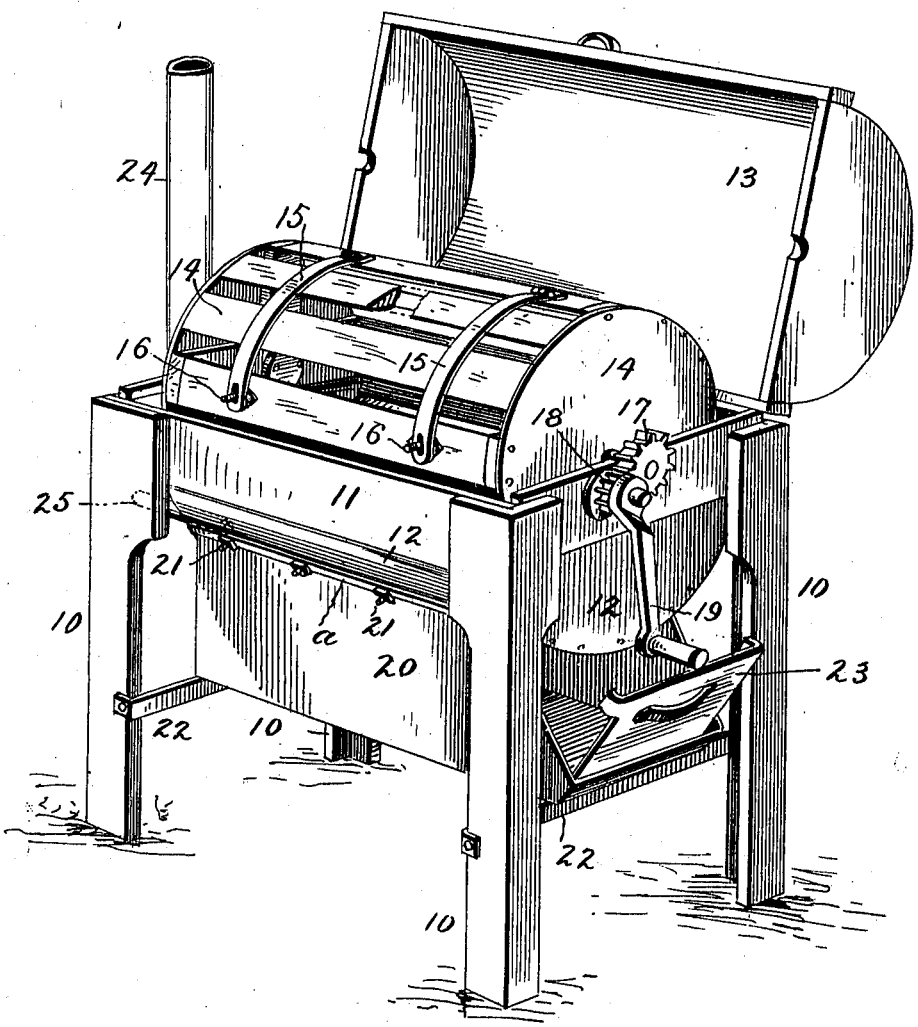
WITNESSES
Agnes J. Hayes.
C. J. Williamson
INVENTOR
John T. McNorton,
John S. Stanley,
Chas. H. Fowler, Attorney

UNITED STATES PATENT OFFICE.

JOHN T. McNORTON AND JOHN S. STANLEY, OF McKINNEY, TEXAS.

MACHINE FOR WASHING CLOTHES, RENOVATING FEATHERS, CANNING, &c.

982,385. Specification of Letters Patent. Patented Jan. 24, 1911.

Application filed May 26, 1910. Serial No. 563,598.

*To all whom it may concern:*

Be it known that we, JOHN T. McNORTON and JOHN S. STANLEY, citizens of the United States, residing at McKinney, in the county of Colin and State of Texas, have invented certain new and useful Improvements in Machines for Washing Clothes, Renovating Feathers, Canning, &c., and do hereby declare that the following is a full, clear, and exact description of the same, reference being had to the annexed drawings, making a part of this specification, and to the letters and figures of reference marked thereon.

The object of our invention is to provide a simple and very efficient machine for washing clothes, renovating feathers, etc., our object more particularly being to provide such a machine which will be equipped with a fire-box or stove for heating the water.

For the attainment of our object, our invention consists in a machine constructed as hereinafter specified and claimed.

Referring to the drawings, the figure is a perspective view of a machine embodying our invention, the top or cover being shown in an open position, and the fire-box door or cover being also shown open.

In the machine shown in the drawings, a supporting frame is used, comprising four legs 10, connected at the top to a rectangular frame 11, to which is attached a half cylinder 12, the other half of the cylinder 13 being hinged at one edge to the rectangular frame 11, so that it may be moved to cover or uncover the half cylinder 12, so that the two together when closed contitute a complete cylinder.

Journaled in the rectangular frame 11, is a reel 14, adapted to hold clothes, etc., composed of two circular heads and a series of parallel slats, all but a few of the slats being attached to said heads, and said few slats being attached to straps 15, that are hinged to one of the slats so that they constitute a hinge section or door to afford access to the interior of the reel to place clothes, etc. therein for washing, or removing them therefrom. The straps at the free ends are provided with openings or holes that pass over bolts or screws 16, mounted on one of the slats connected to the two heads and adapted to receive the clamping nuts which hold the movable section or door in a closed position.

Attached to one of the reel heads or to the shaft or axle projecting therefrom, is a gear wheel 17, with which meshes the pinion 18, that is fixed to a crank 19, for revolving the pinion, and through the gear wheel revolving the reel with the clothes or other objects therein. The clothes-holding reel may be bodily lifted out of the frame, should it be necessary, and when this is done the crank and pinion are undisturbed.

The half cylinders, and especially the lower stationary half cylinder, are of sheet metal so as to withstand heat, and beneath the lower stationary half cylinder we place the fire-box or stove 20, which is formed of sheet metal and which comprises a bottom and two sides, each side having at its edge a flange *a* by which, through bolts 21, it is secured to the lower or stationary half cylinder, so that the fire-box or stove is supported, in part at least, by said lower or stationary half cylinder.

As a supplemental supporting means the fire-box or stove rests near each end upon a horizontal bar 22, which is attached to a pair of supporting legs 10, and which forms a brace for said legs. At one end the fire-box or stove has a door 23, that may be moved to open and close the end of the fire-box for the placing of fuel therein and the removal of ashes therefrom. At its other end the fire-box is closed except for a smoke-pipe 24. Besides washing clothes, renovating feathers, our machine can be used as a canner.

To remove or discharge water from the cylinder, a discharge pipe 25 is preferably provided.

Having thus described our invention what we claim is:

In a machine of the class described, the combination of a cylinder comprising a stationary lower section and a movable upper section, a supporting frame having legs to which frame the lower portion of the cylinder is attached, a fire-box having side walls each with a flange at its upper edge engaging and directly attached to the lower section of the cylinder, and bars attached to said frame legs at the underside of the firebox, forming leg braces and fire-box supports.

In testimony whereof we affix our signatures in presence of two witnesses.

JOHN T. McNORTON.
JOHN S. STANLEY.

Witnesses:
MAUDE E. JOHNSON,
R. C. MERRITT.